(12) United States Patent
Ogane et al.

(10) Patent No.: US 11,892,658 B2
(45) Date of Patent: Feb. 6, 2024

(54) CEMENTED LENS, OPTICAL SYSTEM INCLUDING THE SAME, OPTICAL APPARATUS, AND METHOD FOR MANUFACTURING CEMENTED LENS

(71) Applicant: CANON KABUSHIKI KAISHA, Tokyo (JP)

(72) Inventors: Masanobu Ogane, Yokohama (JP); Kenji Makino, Kawasaki (JP); Norihiko Ochi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 16/531,551

(22) Filed: Aug. 5, 2019

(65) Prior Publication Data

US 2020/0049862 A1 Feb. 13, 2020

(30) Foreign Application Priority Data

Aug. 8, 2018 (JP) .................................. 2018-149520

(51) Int. Cl.
 *G02B 3/00* (2006.01)
 *G02B 1/10* (2015.01)

(52) U.S. Cl.
 CPC .............. *G02B 3/0062* (2013.01); *G02B 1/10* (2013.01)

(58) Field of Classification Search
 CPC .......... G02B 3/00; G02B 3/0062; G02B 1/10; G02B 1/11; G02B 1/111; G02B 1/14; G02B 1/18; G02B 7/025; G02B 7/028; G02B 5/003; G02B 27/0018; G02B 2207/109; G02B 2207/107

USPC ........ 359/619, 614, 611, 580, 738, 811, 819
See application file for complete search history.

(56) References Cited

U.S. PATENT DOCUMENTS

| | | |
|---|---|---|
| 2006/0067607 A1 | 3/2006 | Fang |
| 2006/0192093 A1 | 8/2006 | Kok |
| 2012/0243093 A1 | 9/2012 | Tonar |
| 2012/0328929 A1 | 12/2012 | Matsumoto |
| 2014/0276481 A1 | 9/2014 | Pugh |
| 2015/0022894 A1* | 1/2015 | Yamamoto ............. C08G 59/50 359/580 |
| 2015/0097109 A1 | 4/2015 | Maetaki |
| 2017/0073524 A1* | 3/2017 | Nakayama ........... C09D 127/18 |
| 2017/0106399 A1 | 4/2017 | Sreenivasan |

(Continued)

FOREIGN PATENT DOCUMENTS

| | | |
|---|---|---|
| CN | 1989427 A | 6/2007 |
| CN | 102162866 A | 8/2011 |

(Continued)

OTHER PUBLICATIONS

English translation of JP 2011090264 (Year: 2011).*

(Continued)

*Primary Examiner* — Jie Lei
(74) *Attorney, Agent, or Firm* — Canon U.S.A., Inc., IP Division (57) ABSTRACT

A cemented lens includes a first optical element, a second optical element, a third optical element sandwiched between the first optical element and the second optical element and containing resin, a light shielding layer covering a surface of the third optical element that is in contact with neither the first optical element nor the second optical element, and a porous layer covering at least a part of the light shielding layer.

19 Claims, 4 Drawing Sheets

(56) References Cited

U.S. PATENT DOCUMENTS

| | | |
|---|---|---|
| 2017/0363836 A1 | 12/2017 | Shimizu |
| 2018/0217402 A1 | 8/2018 | Larmagnac |

FOREIGN PATENT DOCUMENTS

| | | | | |
|---|---|---|---|---|
| CN | 104379649 A | 2/2015 | | |
| CN | 105474088 A | 4/2016 | | |
| CN | 105652351 A | 6/2016 | | |
| CN | 105866944 A | 8/2016 | | |
| CN | 106526715 A | 3/2017 | | |
| CN | 206057676 U | 3/2017 | | |
| CN | 107085255 A | 8/2017 | | |
| JP | 2001-42212 A | 2/2001 | | |
| JP | 2010-117472 A | 5/2010 | | |
| JP | 2011090264 * | 5/2011 | ............... | G02B 7/02 |
| JP | 2013025318 A | 2/2013 | | |
| JP | 2013-170199 A | 9/2013 | | |
| JP | 2015108642 * | 6/2015 | ............... | G02B 3/00 |
| JP | 2015-222450 A | 12/2015 | | |
| JP | 2017-054125 A | 3/2017 | | |
| TW | 200827766 A | 7/2008 | | |
| WO | 2013/027366 A1 | 2/2013 | | |
| WO | 2016/157975 A1 | 10/2016 | | |

OTHER PUBLICATIONS

English translation of JP 2015108642. (Year: 2015).*
Zhi-Guang, L., et al., "Functional Applications of Ordered Honeycomb-Patterned Porous Films Based on the Breath Figure Technique", Acta Phys.-Chim. Sin., Mar. 15, 2015, pp. 393-411, vol. 31, No. 3.

* cited by examiner

CEMENTED LENS, OPTICAL SYSTEM INCLUDING THE SAME, OPTICAL APPARATUS, AND METHOD FOR MANUFACTURING CEMENTED LENS

BACKGROUND OF THE INVENTION

Field of the Invention

The present disclosure relates to a cemented lens used in an optical apparatus such as a camera, binoculars, and a microscope, an optical system including it, and an optical apparatus.

Description of the Related Art

A cemented lens including a plurality of lenses cemented together with use of an optically transparent resin (cementing resin) is widely used in an optical system of an optical apparatus such as a camera and a binocular (Japanese Patent Application Laid-Open No. 2001-42212). Because relative positions of the plurality of lenses are fixed by the resin, the cemented lens can reduce a tolerance such as decentering compared to an optical system formed by individually arranging the plurality of lenses, thereby preventing or reducing deterioration of performance due to an assembling tolerance (insufficient positional accuracy) of the lenses.

An optical element used in the optical apparatus is subjected to a treatment for reducing stray light by providing a black light shielding layer on a region outside an effective ray diameter (also called a region outside an optically effective portion), such as an edge portion, as necessary. This configuration allows the stray light delivered to the region outside the optically effective portion of the lens to be absorbed by the light shielding layer, and therefore can reduce unnecessary light that may cause flare, ghost, and the like. There is known a technique for providing the cemented lens with the light shielding layer on the region outside the effective ray diameter including an edge portion of the cementing resin layer with an aim of acquiring a similar effect (Japanese Patent Application Laid-Open No. 2013-170199).

Generally, the light shielding layer is formed by thermally curing a curable resin such as an epoxy resin to which a pigment or a dye capable of absorbing light is added. In the case of the cemented lens, a cemented interface is easily peeled off due to a difference in a linear expansion coefficient between the cementing resin and the lens made of glass, which raises necessity of thermally processing and curing the resin that will form the light shielding layer at a lower temperature than that for a single lens.

SUMMARY OF THE INVENTION

According to an aspect of the present disclosure, a cemented lens includes a first optical element, a second optical element, a third optical element sandwiched between the first optical element and the second optical element and containing resin, a light shielding layer covering a surface of the third optical element that is in contact with neither the first optical element nor the second optical element, and a porous layer covering at least a part of the light shielding layer.

Further features of the present disclosure will become apparent from the following description of exemplary embodiments with reference to the attached drawings.

DESCRIPTION OF THE EMBODIMENTS

Tests generally conducted on a lens include a test that applies a thermal impact by subjecting the lens to an environment of a room temperature and a room humidity suddenly after subjecting the lens to an environment of a high temperature and a high humidity for a long time (hereinafter referred to as a temperature and humidity test) to check how durable the lens is against a change in an ambient temperature and humidity expected to occur when the lens is in actual use.

When the temperature and humidity test is conducted on a conventional cemented lens equipped with a light shielding layer formed by curing a cementing resin at a low temperature, the test results in occurrence of a phenomenon in which an outer peripheral portion of a layer of the cementing resin is scattered and an optical characteristic is deteriorated. This is considered to be due to the following reason.

The layer of the cementing resin (hereinafter referred to as the cementing resin layer) sandwiched by lenses is held in a state of being confined by the lenses and the light shielding layer as a whole since an edge portion of the cementing resin layer not in contact with the lenses is covered with the light shielding layer. The light shielding layer of the cemented lens is cured at the relatively low temperature, which makes it difficult to smoothly progress the curing of the resin compared to when the light shielding layer is cured at a high temperature, whereby the resin is formed in a less cured state. The less cured resin is more permeable to moisture compared to a highly cured resin, so that moisture permeates the resin from the light shielding layer and is absorbed by the cementing resin layer more and more when the cemented lens is subjected to the environment of the high temperature and the high humidity for a long time.

When the cemented lens is subjected to the environment of the room temperature and the room humidity from the environment of the high temperature and the high humidity, the moisture absorbed by the cementing resin layer is emitted from the edge portion not in contact with the lenses. However, when the cemented lens is subjected to the environment of the room temperature and the room humidity suddenly as in the temperature and humidity test, the cemented lens starts to be cooled drastically from an outer peripheral portion thereof, which leads to a reduction in the moisture permeability of the light shielding layer containing the resin, and the moisture absorbed by the cementing resin layer becomes difficult to be emitted outward via the light shielding layer. As a result, the moisture is brought into a supersaturated state at the edge portion of the cementing resin layer to cause condensation on an interface between the cementing resin layer and the lens. Then, the condensation causes the cementing resin layer to peel off from the lens at the interface therebetween, resulting in the scattering.

Such a result of the temperature and humidity test means that, in actual use, the change in the environment may cause the cementing resin layer to be scattered at the edge portion thereof and may lead to deterioration of the optical characteristic.

The present disclosure is directed to a cemented lens highly durable against the change in the environment, and an optical system and an optical apparatus including the cemented lens.

In the following description, an exemplary embodiment of the present disclosure will be described in detail with reference to the drawings.

(Cemented Lens)

Figure 1A:
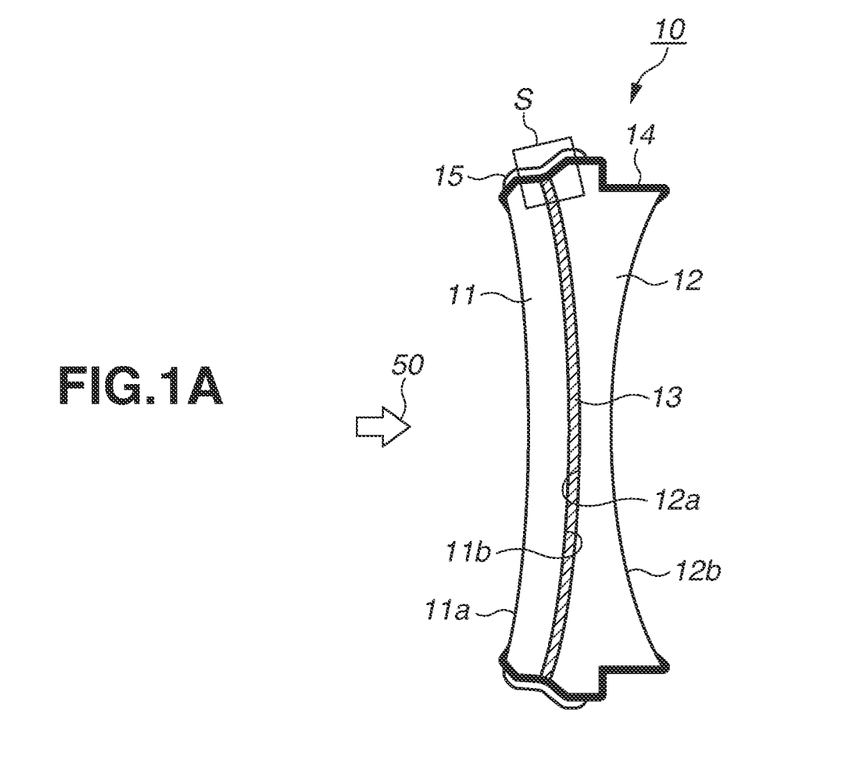
FIG. 1A is a cross-sectional view schematically illustrating an optical element according to one exemplary embodiment of the present disclosure.
Figure 1B:
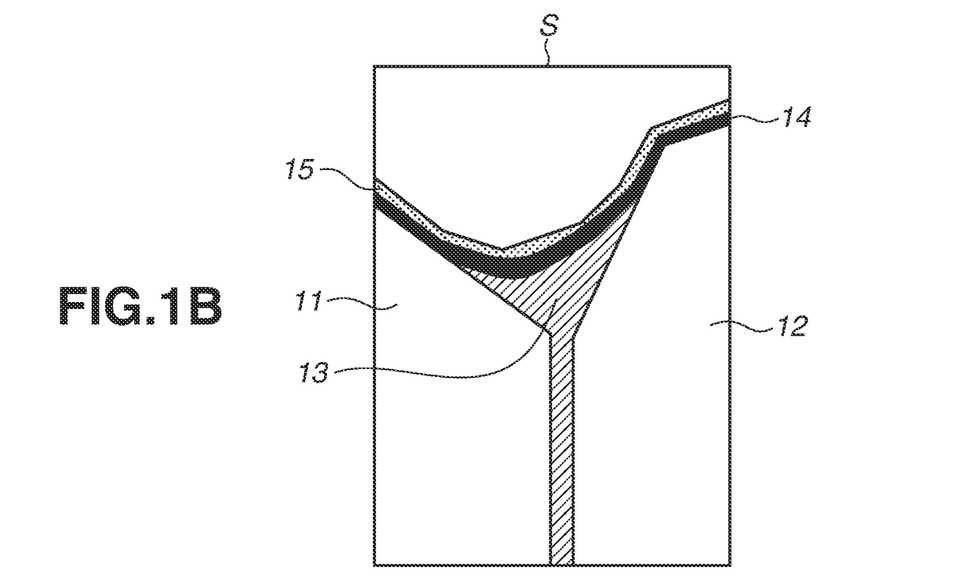
FIG. 1B is an enlarged view illustrating a region at an edge portion of the optical element illustrated in FIG. 1A.
Figure 2:
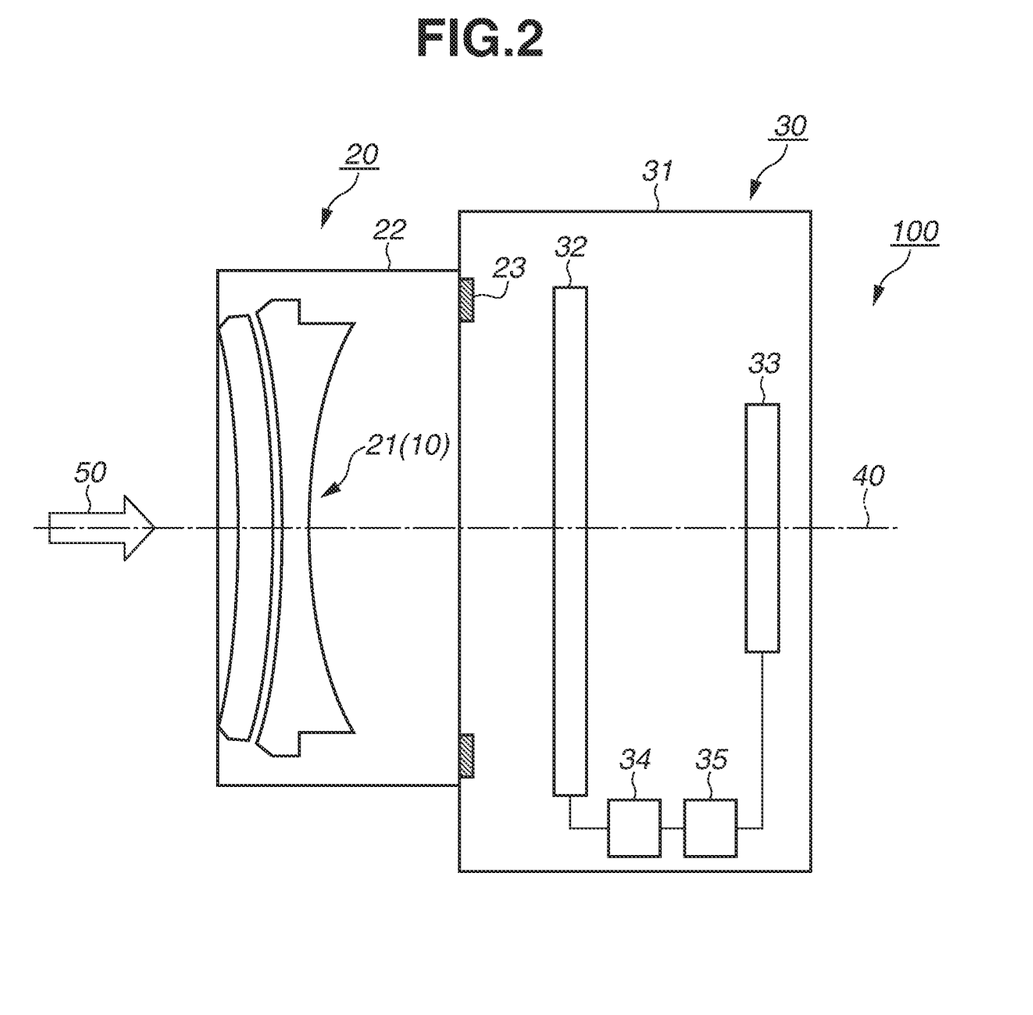
FIG. 2 is a cross-sectional view schematically illustrating an imaging apparatus using the optical element according to the exemplary embodiment of the present disclosure.

FIG. 1A is a cross-sectional view schematically illustrating a cemented lens according to one exemplary embodiment of the present disclosure, and FIG. 1B is an enlarged view schematically illustrating a region S at an edge surface of the cemented lens illustrated in FIG. 1A. A cemented lens 10 is used as an optical system of an optical apparatus such as an imaging apparatus (including a camera, a video apparatus, and the like), a telescope, binoculars, a copying machine, and a projector, or is used as a part of the optical system. As one example, FIG. 2 illustrates a schematic cross section of an imaging apparatus 100 with a lens unit (optical system) 20 mounted on an imaging unit 30. A cemented lens 21 (10) is disposed inside a casing cylinder 22 of the lens unit 20, and is fixed to the imaging unit 30 by a mount 23. The imaging unit 30 includes an image sensor 33, which receives light transmitted through the lens unit 20, and a shutter 32 inside a casing 31. The image sensor 33 is disposed in such a manner that an optical axis of the cemented lens 21 passes through a center of the image sensor 33. The imaging unit 30 further includes a driving unit 34, which opens and closes the shutter 32, and a control unit 35, which controls the driving unit 34 and data readout from the image sensor 33.

The cemented lens 10 according to the present exemplary embodiment includes a first lens (first optical element) 11, a second lens (second optical element) 12, and a cementing resin layer (third optical element) 13, which cements the first lens 11 and the second lens 12 together. Then, the cemented lens 10 includes a light shielding layer (second resin layer) 14 and a porous layer 15 covering the light shielding layer 14 on an edge surface of the cemented lens 10 including an edge surface of the cementing resin layer 13, on which the cementing resin layer 13 is not in contact with the first lens 11 nor the second lens 12.

As the first lens 11 and the second lens 12, optical glasses shaped to suit an optical characteristic required for the cemented lens 10 can be selected and combined.

The cementing resin layer 13 is a layer formed by curing an adhesive used to cement the glass lenses together. The adhesive is required to exert a strong adhesive force and be curable at a high speed in addition to being optically transparent. Acrylic, epoxy, and polyene-polythiol curing adhesives can be desirably used as the adhesive. These adhesives contain a curing initiator added therein and are curable by heat or ultraviolet light. However, curing by the heat may cause interfacial debonding or deformation of a surface shape. Thus, it is desirable to use an ultraviolet-curable adhesive as the adhesive to be the cementing resin layer 13. Further, it is also desirable to use the adhesive after mixing and dispersing inorganic fine particles or the like in the adhesive from a viewpoint of a reduction in shrinkage on curing of the adhesive and an adjustment of the optical characteristic.

A light incident surface 11a and a light emission surface 11b of the first lens 11, and a light incident surface 12a and a light emission surface 12b of the second lens 12 are interfaces with a material having a different refractive index, and are refractive surfaces. If a difference is large between the refractive indexes of the materials in contact with each other on these interfaces, reflection of light occurs. Thus, an antireflection film (not illustrated) is provided to reduce the difference between the refractive indexes as necessary.

(Light Shielding Layer)

The light shielding layer 14 is not limited in particular as long as it is a layer capable of preventing or reducing the stray light. The light shielding layer 14 desirably has such a light absorption characteristic that an average extinction coefficient, which is an average value of extinction coefficients at wavelengths from 400 nm to 700 nm, is 0.03 or higher and 0.15 or lower. More desirably, the average extinction coefficient is 0.03 or higher and 0.1 or lower. The average extinction coefficient of 0.03 or higher allows reflected light to be reduced on an interface between the light shielding layer 14 and air, and the average extinction coefficient of 0.15 or lower allows the reflection light to also be reduced on an interface between the lens and the light shielding layer 14.

An epoxy resin containing a black pigment, a black dye, or a pigment for adjusting the refractive index is widely used as the light shielding layer 14 from a viewpoint of the optical characteristic and adhesiveness with the lenses 11 and 12 and the cementing resin layer 13.

The light shielding layer 14 is provided on the edge surface of the cementing resin layer 13, and may also be provided on the lens 11 and/or the lens 12 corresponding to a position where the stray light would reach.

Desirably, the light shielding layer 14 has an average thickness of 2 μm or more and 50 μm or less to exert a sufficient light absorption function. The average thickness of 2 μm or more allows the light shielding layer 14 to acquire an optical characteristic (light absorption characteristic) required for the light shielding layer, thereby allowing the light shielding layer 14 to sufficiently block or reduce the stray light. The average thickness of 50 μm or less facilitates installation of the cemented lens 10 into the imaging apparatus 100. More desirably, the average thickness is 30 μm or less. The average thickness of 30 μm or less makes it difficult for the light shielding layer 14 itself to be cracked or peeled off due to a stress caused by the curing.

(Porous Layer)

As described above, the phenomenon that the cementing resin layer 13 is scattered at the outer peripheral portion thereof due to the temperature and humidity test is considered to be caused by the drastic reduction in the temperature at the edge portion of the cemented lens 10 due to the drastic reduction in the ambient temperature. Thus, in the exemplary embodiment of the present disclosure, the porous layer 15 is provided on the light shielding layer 14, and the drastic change in the temperature at the light shielding layer 14 and the edge portion of the cementing resin layer 13 is prevented or reduced with the aid of a heat insulation property of the porous layer 15. The porous layer 15 used in the exemplary embodiment of the present disclosure has such a structure that holes included in the porous layer 15 are spatially in communication with each other (hereinafter referred to as a communication hole structure) to allow moisture contained in the cementing resin layer 13 and the light shielding layer 14 to be emitted into the atmosphere. Thus, the light shielding layer 14 and the atmosphere are spatially connected to each other. The porous layer 15 may also contain a spatially closed void.

A method for manufacturing the porous layer 15 is not limited in particular as long as the communication hole structure can be constructed. However, a method that forms the porous layer 15 by applying a coating material containing a particle onto the light shielding layer 14 is easy and desirable because the light shielding layer 14 is often formed on a side surface of the lens in the case of the cemented lens.

A solid particle, a hollow particle, a chainlike particle in which a plurality of particles is connected to each other in a bent manner, or the like can be used as the particle contained in the coating material forming the porous layer 15. Among them, the chainlike particle is particularly desirable from such a viewpoint that its bent shape facilitates construction of the communication hole structure in the porous layer 15. Further, a coating material formed by selecting from the solid particle, the hollow particle, and the chainlike particle and mixing the particles may also be used from a viewpoint of strength and heat insulation.

Any of an organic material, an inorganic material, and a compound thereof can be used as a material of the particle. However, the inorganic particle is desirable from such a viewpoint that moisture is not stored in the particle when the porous layer 15 is formed and can be easily transmitted into the atmosphere. A particle of a known component such as silica, alumina, titania, zirconia, and magnesium fluoride can be used as the inorganic particle. Among them, it is desirable to use the silica particle, which is chemically stable toward moisture and easily manufacturable.

Insides of the communication holes of the porous layer 15 are air, and therefore a ratio of the holes in the layer 15 can be expressed by a refractive index. When the porous layer 15 includes a large number of communication holes and many voids, a ratio of air (having a refractive index of 1.0) increases, and the refractive index of the porous layer 15 reduces. Desirably, the ratio of the voids in the porous layer 15 is 1.19 or higher and 1.32 or lower in terms of the refractive index of the porous layer 15. Due to a difficulty in forming a porous layer having a refractive index of lower than 1.19, the refractive index of 1.19 or higher is desirable because of high feasibility in this case, and a refractive index of 1.22 or higher is more desirable because a film satisfying both the ratio of the voids and the strength can be acquired in this case. Further, the refractive index of 1.32 or lower is desirable because the heat insulation property and the moisture permeability required to prevent or reduce the scattering can be acquired in this state.

The porous layer 15 having the refractive index of 1.19 or higher and 1.32 or lower can also be used as a low refractive index film. Thus, in the case where the antireflection film is provided on the light incident surface 11a and/or the light emission surface 12b of the cemented lens 10, it is also desirable to form the porous layer 15 on a surface where the antireflection film is formed, and use it as an outermost layer of the antireflection film to reduce the difference between the refractive indexes of the air and the lens.

Desirably, a thickness of the porous layer 15 provided on the edge surface of the cemented lens 10 is 0.4 µm or more and 10 µm or less. The thickness of 0.4 µm or more allows the porous layer 15 to acquire a sufficient heat insulation effect, thereby bringing about an excellent effect of preventing or reducing the scattering. The thickness of 10 µm or less allows the porous layer 15 to hardly affect the installation of the cemented lens 10 into the optical system of the optical apparatus even with an increase in the thickness corresponding to the addition of the porous layer 15. Further, this thickness can prevent or reduce drying due to volatilization of a volatile component when the layer 15 is formed, and a crack due to shrinkage on curing of a binder.

A function such as water repellency and oil repellency may be added to the porous layer 15. The functionality such as the water repellency and the oil repellency can be added by attaching a known material such as a fluorine compound and silicon onto the surface of the porous layer 15. Particularly, the water-repellent property can prevent or reduce a water film, which impedes the drying, that is generated due to condensation on the surface of the porous layer 15 or inside the porous layer 15 when the cemented lens 10 is taken out from the environment of the high temperature and the high humidity, thereby facilitating the drying of the moisture. Desirably, a contact angle with respect to water is 80 degrees or more from a viewpoint of preventing the water film from being generated. Such a function such as the water repellency and the oil repellency may also be added to the porous layer 15 formed on the light incident surface 11a and/or the light emission surface 12b of the cemented lens 10.

(Method for Forming Porous Layer)

A method for forming the film using the coating material containing the particle that is desirable to form the porous layer 15 will be described. A concentration of the particle contained in the coating material may be any concentration as long as the layer is formed at a concentration that allows the particle to be contained by a desired amount based on the thickness required to form the porous layer 15, and the concentration can be appropriately selected depending on a solvent and a film formation condition. For example, in the case of the silica particle, it is desirable to adjust the concentration of the particle within a range of 3 weight % (wt %) or more and 20 wt % or less in terms of oxides. A concentration of the particle less than 3 wt % results in insufficiency of the thickness formed by applying the coating material once, and a concentration exceeding 20 wt % makes it likely for the particles to be aggregated.

A component for forming a binder for binding and fixing the particles therebetween (hereinafter referred to as a binder component) may be added to the coating material containing the particle. In the case where the binder component is added, hole diameters of the holes formed in the porous layer 15 can be adjusted by adjusting a ratio between the particle and the binder component contained in the coating material. It is desirable to use a coating material containing the binder component at a concentration of 0.2 wt % or more and less than 1.5 wt % to form the porous layer 15 having the holes in communication with each other. The binder component at a concentration of 0.2 wt % or less makes it impossible to acquire appropriate strength as the porous layer 15. Further, the binder component at a concentration as high as 1.5 wt % or more may lead to an excessive amount of the binder component and a failure to construct the communication hole, thereby making it impossible to acquire the moisture permeability required to discharge the moisture absorbed by the cementing resin layer 13.

The binder component can be appropriately selected in consideration of an anti-wear property of the porous layer 15, adhesiveness with the light shielding layer 14, and environmental reliability. In addition to the above-described viewpoints, it is desirable to select an alkoxysilane hydrolysis-condensation product from such a viewpoint that the binder acquired after the binder component is cured does not bear moisture by itself and can easily transmit the moisture to the atmosphere. Particularly, it is desirable to use, as the binder component, an alkoxysilane hydrolysis-condensation product containing a molecular weight of 1000 or more and 3000 or less in terms of polystyrene. The molecular weight of 1000 or more makes it difficult for the layer to be cracked after being cured and also improves stability as the coating material. The molecular weight of 3000 or less allows the coating material to be adjusted to viscosity suitable for application to prevent uneven application, thereby allowing the communication holes formed in the porous layer 15 to be evenly sized. If a large-sized communication hole is partially formed, the strength of the film reduces at a portion where the large-sized communication hole is formed, and therefore the porous layer 15 is undesirably formed as an easily breakable film.

A method for applying the coating material containing the particle is not particularly limited, and a known application method such as application using a brush, a dip coating method, a spin coating method, a spray coating method, and a roll coating method can be employed. The application using the brush is easy and simple when the coating material is applied to a circular shape such as a lens or a stepped shape.

In the case where the porous layer 15 is also provided on the light incident surface 11a and/or the light emission surface 12b of the cemented lens 10 as the outermost layer of the antireflection film, the dip coating method and the spin coating method are particularly useful. Employing these methods allows the porous layer 15 to be applied and formed onto the edge portion of the cemented lens 10 and the light incident surface 11a and/or the light emission surface 12b at the same time.

The coating material containing the particle is dried after being applied. The coating material may be dried naturally by being left at the room temperature, or may be thermally dried by using a dryer, a hot plate, an electric furnace, or the like. As drying conditions, a temperature and a time that do not affect the lens and allow an organic solvent in the porous layer 15 to be evaporated to some degree are set. When the resin is cured to cement the first lens 11 and the second lens 12, which form the cemented lens 10, together by using the resin, a stress due to the shrinkage on curing may remain inside the resin. The stress in the resin may be released due to an influence of the heat at the time of the drying and may cause a surface deformation. Thus, as a drying temperature, the coating material is dried desirably at 100° C. or less, more desirably at 80° C. or less, and still more desirably at 40° C. or less such as a room temperature.

The number of times of the application for the porous layer 15 is desirably once, but the drying and the application may be repeated a plurality of times.

Further, regarding an application method when the water-repellent property is added, such a layer can also be manufactured by using a method similar to that of the porous layer 15.

In the description below, the exemplary embodiment of the present disclosure will be described more specifically by referring to examples. However, the present invention is not to be limited to the examples to be described below and can be appropriately changed within a range that does not depart from the spirit thereof.

Example 1

The cemented lens 10 illustrated in FIG. 1 was manufactured. As the lens 11, S-FSL5 manufactured by Ohara Inc., which had a value of 1.487 as a refractive index at the d line (wavelength of 587.56 nm) (hereinafter referred to as an $n_d$), was prepared. As the lens 12, S-NBH51 manufactured by Ohara Inc., which had an $n_d$ of 1.750, was prepared.

First, the optical surfaces (the light incident surface and the light emission surface) of the lens 11 and the lens 12 were ground, and centering processing was performed on the lens outer peripheral portions generally called edges. Next, a multilayered dielectric film including an alumina layer, a tantalum pentoxide layer, and a magnesium fluoride layer was formed on each of the light incident surface 11a of the lens 11 and the light emission surface 12b of the lens 12 as the antireflection film (not illustrated). An aluminum oxide film (having a refractive index of 1.65) was also formed on the light incident surface 12a of the lens 12 as the antireflection film (not illustrated). Each of the films was formed by the vacuum film forming method. No film was formed in particular on the light emission surface 11b of the lens 11.

The light emission surface 11b of the lens 11 and the light incident surface 12a of the lens 12 were cemented together with use of the adhesive. A polyene-polythiol adhesive, OP-1055H (manufactured by Denka Co., Ltd.) was used as the adhesive. The refractive index after OP-1055H was cured, i.e., the refractive index of the cementing resin layer 13 was 1.52. The light emission surface 12b of the lens 12 is set to face down, and the adhesive was dropped onto the cementing surface. The lens 11 was positioned so as to have a proper positional relationship with the lens 12. Then, the adhesive was cured by irradiating the adhesive with ultraviolet (UV) light. The thickness of the adhesive was set to approximately 10 μm. An outer diameter of the cementing surface of the cemented lens 10 was 30.0 mm.

Subsequently, the light shielding layer 14 was formed by applying GT-7II, which was a light shielding coating material manufactured by Canon Chemicals Inc., onto the edge surface (edge) of the cemented lens 10 so as to have a thickness of 3 to 5 μm on the edge surface of the lens. Then, drying and curing of the light shielding coating material is performed while leaving it at a room temperature of 23° C. for 24 hours. The cemented lens 10 having the light shielding layer 14 formed on the edge surface of the cemented lens 10, i.e., the edge of the lens 11, the edge on the side surface of the lens 12, and the edge surface of the cementing resin layer 13 was acquired.

Next, the coating material for forming the porous layer 15 was prepared. After each of a dispersion liquid containing chainlike silica particles and a solvent, and a solution containing the component required to form the binder (hereinafter referred to as a binder solution) was adjusted, the coating material was prepared by the following method.

(1) Dispersion Liquid Containing Chainlike Silica Particles and Solvent

While 1-ethoxy-2-propanol (hereinafter referred to as 1E2P) was added to 500 g of a 2-propanol (isopropyl alcohol (IPA)) dispersion liquid of the chainlike silica particles (manufactured by Nissan Chemical Industries, Ltd.; IPA-ST-UP (trade name); an average particle diameter: 12 nm, a solid content concentration: 15 percent by mass), IPA was distilled away, by which 750 g of a 1E2P dispersion liquid of the chainlike silica particles at a solid content concentration of 17 percent by mass was prepared.

(2) Binder Solution

A binder solution at a solid content concentration of 11.8 percent by mass was prepared by gradually adding 54 g of diluted hydrochloric acid at 0.01 mol/L to a solution containing 62.6 g of ethyl silicate and 36.8 g of 1E2P and stirring it for five hours at the room temperature.

(3) Coating Material Containing Dispersed Chainlike Silica Particles

The dispersion liquid of the chainlike silica particles was prepared by gradually adding 43 g of the above-described binder solution to 250 g of the 1E2P dispersion liquid of the chainlike silica particles, which was prepared in the above-described process, and then stirring it under the room temperature for two hours after that. Further, the coating material containing the chainlike silica particles dispersed therein (hereinafter may be simply referred to as the coating material) was acquired by adding 820 g of 1E2P in such a manner that the application liquid had a solid content concentration of 4.3 percent by mass and stirring it for 60 minutes.

The acquired coating material containing the chainlike silica particles was applied onto the light shielding layer 14 by pressing a sponge containing the coating material against the light shielding layer 14 while rotating the cemented lens 10 with the light shielding layer 14 formed thereon around the optical axis of the lens at 100 rpm. During the application, the coating material was supplied to the sponge using a dropper so as to be able to maintain an amount required for the application. The cemented lens 10 including the porous layer 15 on the light shielding layer 14 was manufactured by leaving the cemented lens 10 under a clean room atmosphere at the room temperature of 23° C. for two hours after that.

Example 2

A second example is different from the first example in terms of the fact that the chainlike silica particles contained in the coating material for forming the porous layer 15 was replaced with hollow silica particles. Other than that, the cemented lens 10 was manufactured in a similar manner to the first example. In the description below, the second example will be described, omitting descriptions of similar processes to the first example and only focusing on differences.

The coating material containing the hollow silica particles dispersed therein (a solid content concentration was 3.80 percent by mass) that was used to form the porous layer 15 was prepared by the following method.

1E2P was poured into a flask by 50 g. Then, hollow silica sol containing the hollow particles at a solid content concentration of 20.5 percent by mass and IPA as a solvent (Thrulya 1110 manufactured by JGC Catalysts and Chemicals Ltd.) was added into the flask by 200 g, and 1E2P was further added thereto by 136 g. This mixed liquid was condensed by being depressurized to 60 hPa and heated to 45° C. After the mixed liquid was continuously condensed for 30 minutes, a weight of the liquid was reduced to 205 g.

A diluted liquid was prepared by adding 1E2P, 1-butoxy-2-propanol (hereinafter referred to as 1B2P), and 2-ethyl-1-butanol (hereinafter referred to as 2E1B) to the liquid acquired by condensing the mixed liquid so as to add them by amounts at a ratio of 1E2P:1B2P:2E1B=38:31:31. The coating material containing the hollow particles dispersed therein was acquired by stirring this diluted liquid for 30 minutes.

After 5 g of the coating material containing the hollow particles dispersed therein was heated to 1000° C., a solid content concentration thereof was measured. A result thereof was 3.805 percent by mass.

The cemented lens 10 including the porous layer 15 on the light shielding layer 14 was acquired by applying the prepared coating material containing the hollow particles dispersed therein on the cemented lens 10 on which the light shielding layer 14 had been formed in a similar manner to the first example.

Example 3

In a third example, the cemented lens 10 was manufactured in a similar manner to the first example except for the fact that the solid content concentration of the coating material containing the chainlike silica particles dispersed therein that was used in the first example was changed to 7.6 percent by mass.

The solid content concentration of the coating material was adjusted based on the amount of 1E2P added to the chainlike silica particle dispersion liquid adjusted by adding 48 g of the binder solution to 250 g of the 1E2P dispersion liquid of the chainlike silica particles in the first example.

Example 4

In a fourth example, the cemented lens 10 was manufactured in a similar manner to the first example except for the fact that the solid content concentration of the coating material containing the chainlike silica particles dispersed therein that was used in the first example was changed to 2.2 percent by mass.

The solid content concentration of the coating material was adjusted based on the amount of 1E2P added to the adjusted chainlike silica particle dispersion liquid in a similar manner to the third example.

Example 5

In a fifth example, the cemented lens 10 was manufactured in a similar manner to the first example except for the fact that the solid content concentration of the binder in the coating material containing the chainlike silica particles dispersed therein that was used in the first example was changed to 13.7 percent by mass. The solid content concentration of the binder in the coating material was adjusted by the following procedure.

The chainlike silica particle dispersion liquid was prepared by gradually adding 80 g of the binder solution adjusted in a similar manner to the first example to 250 g of the 1E2P dispersion liquid of the chainlike silica particles that was adjusted in a similar manner to the first example, and then stirring it at the room temperature for two hours after that. The coating material containing the chainlike silica particles dispersed therein with the solid content concentration thereof adjusted to 13.7 percent by mass was acquired by further adding 820 g of 1E2P and stirring it for 60 minutes.

Example 6

In a sixth example, the cemented lens 10 was manufactured in a similar manner to the first example until the porous layer 15 was formed, and, after that, the porous layer 15 with the water-repellent property added thereto was formed by applying a fluorine coating material onto the porous layer 15. The sixth example is approximately similar to the first example regarding an outline of the manufacturing method, and therefore will be described omitting a description thereof and only focusing on differences.

A solution of acrylic fluororesin (DURASURF DS-16005CH manufactured by Harves Co., Ltd., and having a solid content concentration of 0.05 percent by mass) was used as the fluorine coating material. The fluorine coating material was applied by a similar method to the application of the coating material containing the chainlike silica particles dispersed therein.

Example 7

Figure 3:
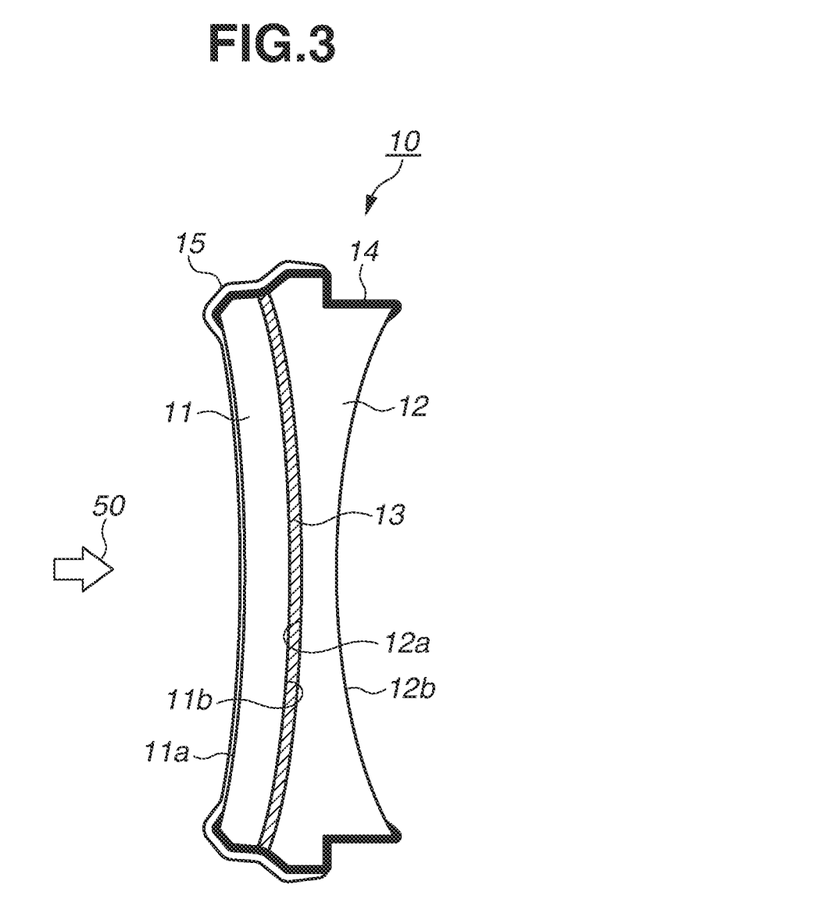
FIG. 3 is a cross-sectional view schematically illustrating an optical element in a seventh example according to the exemplary embodiment of the present disclosure.

In a seventh example, the outermost layer of the antireflection film on the incident surface side of the cemented lens 10, and the porous layer 15 on the light shielding layer 14 were formed at the same time. The seventh example will be described, omitting descriptions of similar processes to the first example and only focusing on differences.

FIG. 3 is a cross sectional view schematically illustrating the cemented lens 10 in the present example. A multilayered dielectric film (not illustrated) including the alumina layer and the tantalum pentoxide layer was formed on the light incident surface 11a of the lens 11 processed by the centering processing in a similar manner to the first example. This resulted in acquisition of the cemented lens 10 provided with the light shielding layer 14 similar to that in the first example except for the fact that the magnesium fluoride layer of the outermost layer was not formed.

The cemented lens 10 with the light shielding layer 14 formed thereon was set on a spin coater with the optical axis of the lens placed at a center while the light incident surface 11a thereof was laid face up. While the cemented lens 10 was rotated at 100 rpm, 0.5 ml of the same coating material as the first example was dropped onto the light incident surface 11a with the multilayered dielectric film formed thereon. The coating material was supplied to the light shielding layer 14 on the edge surface of the cementing resin layer 13 by rotating the cemented lens 10 for five seconds after the coating material was dropped. Then, by rotating the cemented lens 10 at 3500 rpm for one minute, the porous layer 15 as the low refractive index film of the outermost layer of the antireflection layer on the light incident surface 11a and the porous layer 15 on the edge surface of the cemented lens 10 were formed at the same time.

Figure 4:
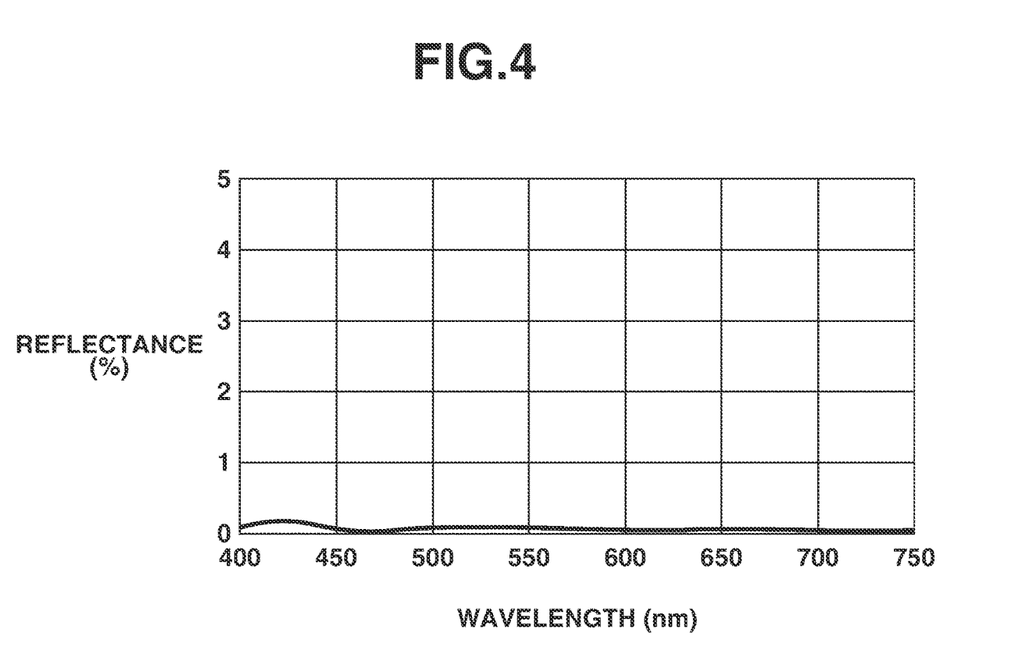
FIG. 4 is a graph illustrating a relationship between a reflectance (%) of the optical element manufactured in the seventh example and a wavelength (nm) of light.

A reflectance of the cemented lens 10 at wavelengths from 400 nm to 750 nm in the present example was measured with use of a reflectance measurement apparatus (USPM-RU manufactured by Olympus Corporation). FIG. 4 illustrates a result thereof. It was confirmed that the seventh example was able to acquire an antireflection film having the reflectance at 0.2% or lower in the measurement range.

Comparative Example 1

In a comparative example 1, the cemented lens was formed in a similar manner to the first example until the light shielding layer was formed, but the processes after that were omitted and the cemented lens with no porous layer provided at the edge portion was manufactured.

Comparative Example 2

In a comparative example 2, the cemented lens was formed in a similar manner to the first example until the light shielding layer was formed. After that, a layer containing silica but not porous was formed by applying a coating material of a silica hydrolysis condensation product (T-111 manufactured by Honeywell International Inc., and having a solid content concentration of 4.5 percent by mass) onto the light shielding layer.

Comparative Example 3

In a comparative example 3, the cemented lens was formed in a similar manner to the first example until the light shielding layer was formed. After that, the cemented lens 10 was manufactured by forming the porous layer 15 in a similar manner to that in the first example except for the fact that the solid content concentration of the coating material containing the chainlike silica particles dispersed therein that was used to form the porous layer 15 in the first example was adjusted to 17 percent by mass.

Comparative Example 4

In a comparative example 4, the cemented lens was formed in a similar manner to the first example until the light shielding layer was formed. After that, the cemented lens 10 was manufactured by forming the porous layer 15 in a similar manner to that in the first example except for the fact that the solid content concentration of the coating material containing the chainlike silica particles dispersed therein that was used to form the porous layer 15 in the first example was adjusted to 0.5 percent by mass.

(Evaluation)

The porous layers and the cemented lenses acquired in the above-descried examples and comparative examples were evaluated using the following method.

(1) Measurement of Refractive Index

The refractive index of the porous layer 15 was determined by measuring, with use of a spectroscopic ellipsometer (EC-400 manufactured by J. A. Woollam Co.), a layer formed by spin-coating the coating material used in each of the examples and comparative examples onto a silicon substrate at 4000 rpm. A value at a wavelength of 588 nm was used as the refractive index.

(2) Measurement of Thickness

The thickness of the porous layer 15 was measured using a field-emission-type scanning electron microscope (UL-TRA 55 manufactured by Carl Zeiss Microscopy) after grinding a split cross section of the cemented lens after the temperature and humidity test.

(3) Temperature and Humidity Test

After being placed in a high-temperature high-humidity tank of 60° C. and 90 relative humidity (RH) % for 500 hours, the cemented lens was taken out into an environment of 23° C. and 50 RH %, and whether the cemented lens was scattered at the outer peripheral portion thereof was visually observed after being taken out. The result was evaluated based on the following criteria.

A: The scattering was not confirmed on the outer peripheral portion.

B: The scattering was confirmed on the outer peripheral portion.

(4) Crack of Film

After the coating material for forming the porous layer 15 was applied and the drying thereof was completed, whether a peel-off had occurred due to a crack of the porous layer 15 after 24 hours was visually checked. The result was evaluated according to the following criteria.

A: The peel-off due to the crack was not observed on the edge surface of the cemented lens.

B: The peel-off due to the crack was observed on the edge surface of the cemented lens.

(5) Measurement of Contact Angle

A contact angle (contact angle with respect to water) when 2 µl of pure water in the form of liquid droplets was brought into contact with the surface of the porous layer 15 was measured with use of a fully automatic contact angle meter (DM-701 manufactured by Kyowa Interface Science Co., Ltd.).

A table 1 indicates results of conducting the evaluations (1) to (5) with respect to the porous layers and the cemented lenses acquired in the examples and the comparative examples.

(6) Wipe Evaluation

The adhesiveness was evaluated by wiping the surface of the porous layer 15 under a load of 50 g with use of an unwoven fabric (Closer VT25 manufactured by Ozu Cooperation) and then visually checking a result thereof after that.
A: A peel-off was not observed after the porous layer 15 was wiped.
B: A peel-off was observed after the porous layer 15 was wiped.

the first to fifth examples, but no water film was observed while the condensation and the drying performance were excellent in the sixth example in which the contact angle with respect to water is large.

On the other hand, the scattering was observed as a result of the temperature and humidly test in the comparative example 1 in which the porous layer 15 was not formed and the comparative example 2 in which the non-porous silica layer was formed. The peel-off due to the crack of the film was observed and the scattering was observed as a result of the temperature and humidity test in the comparative example 3 in which the porous layer 15 had a thick film thickness. Further, the scattering was observed as a result of

TABLE 1

| | Layer Covering Light Shielding Layer | Thickness [μm] | Refractive Index at λ = 588 nm | High-temperature and High-humidity Test | Crack of Film | Contact Angle with respect to Water [degrees] | Wipe Test |
|---|---|---|---|---|---|---|---|
| Example 1 | Porous Layer Containing Chainlike Particles | 2 | 1.24 | A | A | 5 | A |
| Example 2 | Porous Layer Containing Hollow Particles | 1 | 1.19 | A | A | 9 | B |
| Example 3 | Porous Layer Containing Chainlike Particles | 10 | 1.24 | A | A | 5 | A |
| Example 4 | Porous Layer Containing Chainlike Particles | 0.4 | 1.24 | A | A | 5 | A |
| Example 5 | Porous Layer Containing Chainlike Particles | 2 | 1.32 | A | A | 5 | A |
| Example 6 | Porous Layer Containing Chainlike Particles | 2 | 1.25 | A | A | 110 | A |
| Example 7 | Porous Layer Containing Chainlike Particles | 2 | 1.24 | A | A | 5 | A |
| Comparative Example 1 | None | 0 | — | B | — | — | A |
| Comparative Example 2 | Non-porous Layer (Silica Hydrolysis condensation product) | 2 | 1.39 | B | A | 99 | A |
| Comparative Example 3 | Porous Layer Containing Chainlike Particles | 15 | 1.23 | B | B | 5 | A |
| Comparative Example 4 | Porous Layer Containing Chainlike Particles | 0.05 | 1.22 | B | A | 5 | A |

(Evaluation of Examples and Comparative Examples)

The porous layer 15 having a thickness falling within the range from 0.4 μm to 10 μm and a refractive index falling within the range of 1.19 to 1.32 was formed on the cemented lens 10 in each of the first to sixth examples. With the outer peripheral portion not scattered and the film neither cracked due to the temperature and humidity test in addition thereto, an excellent result was acquired. A water film in a color of a soap bubble was visually observed immediately after the cemented lens 10 was taken out from the test tank in each of the temperature and humidity test in the comparative example 4 in which the porous layer 15 had a thickness as thin as 0.05 μm.

From the above-described results, it was confirmed that the cemented lens 10 according to the exemplary embodiment of the present disclosure prevented or reduced the scattering occurring at the edge portion of the cementing resin layer 13 due to the change in the environment and prevented or reduced the deterioration of the optical characteristic.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-149520, filed Aug. 8, 2018, which is hereby incorporated by reference herein in its entirety.

What is claimed is:

1. A cemented lens comprising:
a first optical element;
a second optical element;
a third optical element sandwiched between the first optical element and the second optical element, the third optical element containing resin;
a light shielding layer covering side surfaces of the first optical element, the second optical element, and the third optical element, and being disposed in contact with the third optical element; and
a porous layer covering at least a part of the light shielding layer,
wherein a thickness of the porous layer on the light shielding layer is 0.4 µm or more and 10 µm or less and the porous layer is configured to allow moisture contained in the third optical element and the light shielding layer to be emitted into atmosphere.

2. The cemented lens according to claim 1, wherein the porous layer has a communication hole structure.

3. The cemented lens according to claim 2, wherein the porous layer is a layer containing a silica particle.

4. The cemented lens according to claim 3, wherein the silica particle includes a chainlike silica particle.

5. The cemented lens according to claim 4, wherein a refractive index of the porous layer is 1.19 or higher and 1.32 or lower.

6. The cemented lens according to claim 4, wherein a fluorine compound or silicon is attached to a surface of the porous layer, and a contact angle of the surface with respect to water is 80 degrees or larger.

7. The cemented lens according to claim 4, wherein the porous layer covers a light incident surface of the cemented lens.

8. The cemented lens according to claim 1, wherein the light shielding layer is depressed toward the third optical element at a portion in contact with the third optical element.

9. The cemented lens according to claim 1, wherein the porous layer is disposed on the side surfaces of the first optical element and the second optical element via the light shielding layer.

10. The cemented lens according to claim 1, wherein the first optical element and the second optical element are cemented by the third optical element.

11. The cemented lens according to claim 1, wherein the porous layer has a heat insulation property.

12. The cemented lens according to claim 1, wherein the porous layer has such a structure that holes included in the porous layer are spatially in communication with each other.

13. An optical system comprising:
a casing cylinder; and
a cemented lens being disposed inside the casing cylinder, wherein the cemented lens comprising:
a first optical element;
a second optical element;
a third optical element sandwiched between the first optical element and the second optical element, the third optical element containing resin;
a light shielding layer covering side surfaces of the first optical element, the second optical element, and the third optical element, and being disposed in contact with the third optical element; and
a porous layer covering at least a part of the light shielding layer,
wherein a thickness of the porous layer on the light shielding layer is 0.4 µm or more and 10 µm or less and the porous layer is configured to allow moisture contained in the third optical element and the light shielding layer to be emitted into atmosphere.

14. An optical apparatus comprising:
an optical system; and
an image sensor configured to receive light incident via the optical system,
wherein the optical system comprising:
a casing cylinder; and
a cemented lens being disposed inside the casing cylinder, wherein the cemented lens comprising:
a first optical element;
a second optical element;
a third optical element sandwiched between the first optical element and the second optical element, the third optical element containing resin;
a light shielding layer covering side surfaces of the first optical element, the second optical element, and the third optical element, and being disposed in contact with the third optical element; and
a porous layer covering at least a part of the light shielding layer,
wherein a thickness of the porous layer on the light shielding layer is 0.4 µm or more and 10 µm or less and the porous layer is configured to allow moisture contained in the third optical element and the light shielding layer to be emitted into atmosphere.

15. A method for manufacturing a cemented lens, the method comprising:
cementing a first optical element and a second optical element together with use of an adhesive to fabricate a lens including the first optical element and the second optical element cemented together with a resin layer;
forming a light shielding layer on an edge surface of the lens; and
forming a porous layer covering at least a part of the light shielding layer,
wherein a thickness of the porous layer on the light shielding layer is 0.4 µm or more and 10 µm or less and the porous layer is configured to allow moisture contained in the third optical element and the light shielding layer to be emitted into atmosphere.

16. The method for manufacturing the cemented lens according to claim 15, wherein the forming of the porous layer includes forming the porous layer by applying a coating material containing a particle dispersed therein and drying the coating material.

17. The method for manufacturing the cemented lens according to claim 16, wherein a temperature for drying the coating material containing the particle dispersed therein is 100° C. or lower.

18. The method for manufacturing the cemented lens according to claim 17, wherein the coating material containing the particle dispersed therein contains a silica particle at a concentration of 3 weight % (wt %) or more and 20 wt % or less in terms of oxides.

19. The method for manufacturing the cemented lens according to claim 18, wherein the coating material containing the particle dispersed therein contains an alkoxysilane hydrolysis-condensation product having a molecular weight of 1000 or more and 3000 or less in terms of polystyrene.

* * * * *